United States Patent [19]

Heare

[11] Patent Number: 4,685,152

[45] Date of Patent: Aug. 11, 1987

[54] INSECT PROTECTIVE GARMENT

[76] Inventor: Nicole G. Heare, 1752 Vine St., Berkeley, Calif. 94703

[21] Appl. No.: 664,046

[22] Filed: Oct. 23, 1984

[51] Int. Cl.⁴ .............................................. A42B 3/00
[52] U.S. Cl. ................................................ 2/4; 2/79; 2/84; 2/227; 2/DIG. 1
[58] Field of Search ................... 2/4, DIG. 1, 84, 79, 2/227

[56] References Cited

U.S. PATENT DOCUMENTS

| | | |
|---|---|---|
| 1,203,155 | 10/1916 | Strout . |
| 1,802,262 | 4/1931 | Mahler . |
| 2,008,152 | 7/1935 | Nier ......................................... 2/79 |
| 2,028,947 | 1/1936 | Palm ....................................... 2/4 X |
| 2,189,892 | 2/1940 | Fox . |
| 2,280,668 | 4/1942 | Sherlock . |
| 2,365,656 | 2/1944 | Lamsa ..................................... 2/4 |
| 2,472,003 | 2/1947 | Wetzel . |
| 2,784,409 | 3/1957 | Slipakoff . |
| 2,869,132 | 1/1959 | Drummond . |
| 3,582,989 | 6/1971 | Fassbender . |
| 3,783,451 | 1/1974 | Malin ...................................... 2/4 |
| 4,422,184 | 12/1983 | Myers ..................................... 2/4 |

*Primary Examiner*—H. Hampton Hunter
*Attorney, Agent, or Firm*—Robert B. Chickering; Glen R. Grunewald

[57] ABSTRACT

A garment to protect the user against insect bites, including an insect-impervious yoke extending from the neckhole across the shoulders and down into the chest and back area, having piping sewn to the bottom edges of the yoke to hold away from the body of the user the semi-rigid mesh material that is draped from the yoke in gathers, and with every opening of the garment other than the neckhole including a closure and gathers whereby the semi-rigid mesh material is held away from the body in the form of an undulating surface.

5 Claims, 4 Drawing Figures

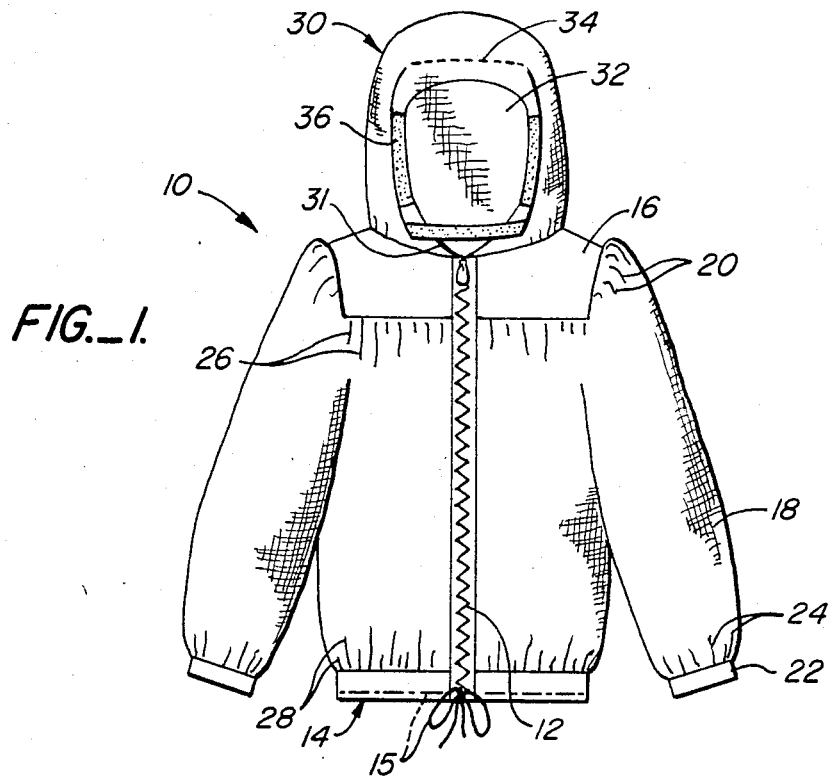
FIG._1.
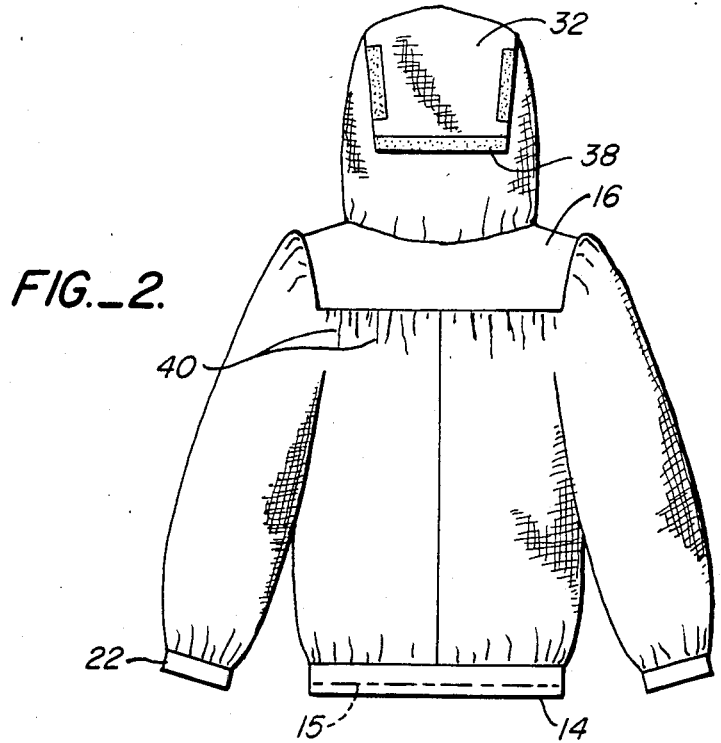
FIG._2.

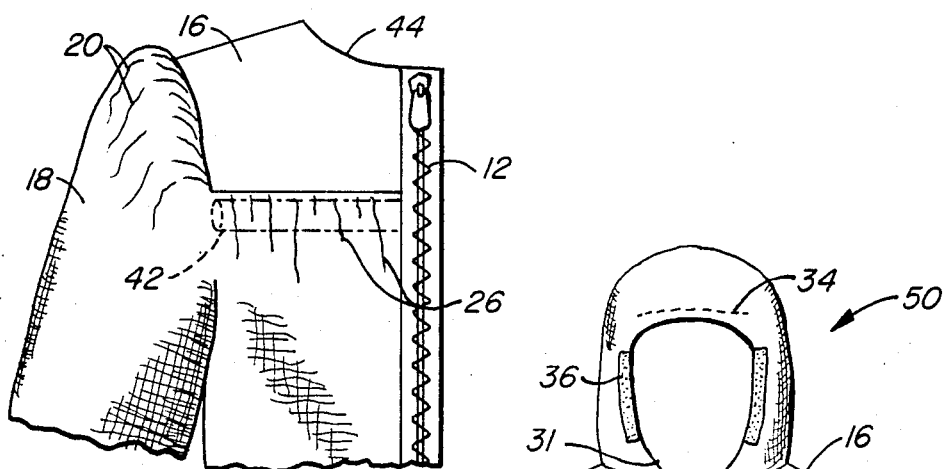
FIG._3.
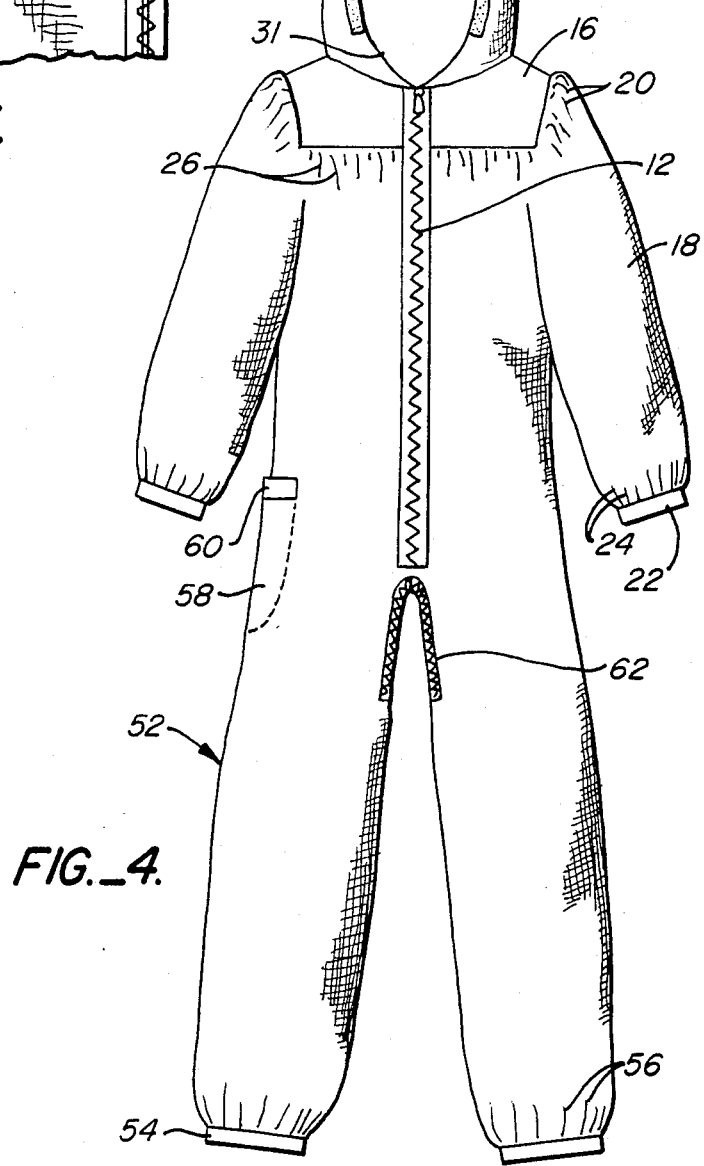
FIG._4.

INSECT PROTECTIVE GARMENT

FIELD OF THE INVENTION

This invention is in the field of protective garments that protect the user against insects.

BACKGROUND OF THE INVENTION

Insect protective garments are known in the prior art. These garments are intended to protect the user's head or body against insects.

Examples of insect protective garments in the prior art are disclosed in U.S. Pat. Nos. 1,203,155 (Strout); 1,802,262 (Mahler); 2,028,947 (Palm); 2,189,892 (Fox); 2,280,668 (Sherlock); 2,365,656 (Lamsa); 2,472,033 (Wetzel); 2,784,409 (Slipakoff); 2,869,132 (Drummond); 3,582,989 (Fassbender); 3,783,451 (Malin); and 4,422,184 (Myers). These patents are relevant to the invention disclosed herein because they represent the closest prior art in the attempt to make insect protective garments that can be worn comfortably in hot climates.

For a garment to be worn comfortably in hot climates, adequate ventilation must be provided. All of the examples cited as prior art, as well as the invention disclosed herein, rely on insect protective mesh for air circulation around the user's skin. If insect protective mesh is to do its job adequately, it must, in some way, be made to lie far enough away from the user's skin so that a barrier that is greater in width than the length of the insects' stingers is created. In other words, the problem in making insect protective garments from mesh is how to keep said mesh away from the user's skin.

Those inventions cited as examples in the prior art that deal with the problem of keeping the mesh away from the user's skin rely on bubble shaped forms made of rigid mesh to keep the insects stingers away or they rely on rigid forms such as hats or visors to make a ledge to drape the mesh from, or they rely on devices such as inflatable tubes, coils of rope, or plastic discs to act as spacers between the mesh and the user's skin.

None of the above inventions disclose a way to keep the protective mesh away from the user's body in a flexible and durable garment that follows the body's natural contours and is free of devices.

SUMMARY OF THE INVENTION

The present invention is a garment to protect the user against insects and spiders. The garment is made from mesh, so it is comfortable in hot climates. Said mesh is a semi-rigid material such as the material commonly used as window screening, so the garment is durable and suitable for people working outdoors in the tropics. This material, with certain sewing and construction techniques that will be described later, makes a garment that allows the user freedom of movement because it follows the body's natural contours and doesn't require devices to make the protective mesh stand away from the user's body.

The garment comprises a body portion that extends from the user's neck to a few inches below the waist. A separating zipper is provided to make the garment easy to get in and out of. A drawstring around the bottom of the garment makes the size adjustable and ensures a tight fit.

A pair of arms with a closing such as strips of hook and loop closure material available under the trademark VELCRO at the wrist may be attached to the body portion. Said VELCRO strips made the size of the wrist closings adjustable and add to the garment's durability by providing reinforcement at this point.

A hood with protective face panel may also be attached to the body portion of the garment. Both the hood and the protective face panel are made from the same semi-rigid mesh used in the body portion and the arms. The face panel can be worn over the face for protection without interfering with the user's breathing or vision, or it can be worn off the face to free the user for eating, drinking, or smoking. When in use, the sides of the face panel are secured to the side edges of the hood by means such as VELCRO strips. The bottoms of the face panel may be tucked into the neckhole of the garment.

Turning now to those sewing and construction techniques mentioned earlier, we come to two elements that are of primary importance to the invention.

The first element is an insect impervious shoulder yoke that serves as the base with which gathered material in the chest, back, and shoulder areas of the garment is associated. This shoulder yoke drapes across the user's shoulders, extending downward in the front and back and is made impervious to insects' stingers by a lining made of a material such as heavy cotton.

The second element is a sewing technique known as gathering. In this technique, an edge of one piece of material is gradually amassed to an edge of a second piece of material with the gradual amassing resulting in a gentle series of puckers. This gentle series of puckers is crucial in maintaining a distance between the insect protective mesh and the user's skin that is greater than the length of the insects' stingers.

As mentioned before, the gathering technique is used in the chest, back, and shoulder areas associated with the garment's insect impervious yoke. The gathering technique is also used at all of the garment's extremities, with the exception of the neckhole.

In a second embodiment of the invention, an integral pair of trousers is added to the garment described above, creating a coverall garment that protects all of the user's body with the exception of the hands and feet.

The trousers of said coverall garment are provided with a zipper in the crotch area that allows the user to perform necessary bodily functions without removing the garment. A further function of this zipper is to increase the garment's durability by providing reinforcement in the crotch and inner top leg area.

The ankle closings of the trousers may be secured with means such as VELCRO strips. These VELCRO strips make the size of the ankle closings adjustable and add to the garment's durability by providing reinforcement at this point.

In summary, the invention disclosed herein overcomes several problems discussed in the background art section. It overcomes the problem of ventilation by the use of insect impervious mesh. It overcomes the problem of how to keep the protective mesh from contact with the user's skin by having an insect impervious shoulder yoke from which gathered material can fall. It overcomes the problem of user freedom of movement by using a semi-rigid mesh material that follows the body's naatural contours. It overcomes the problem of durability by the sturdiness of the material and by reinforcement at strategic seams. Finally, this invention overcomes the problem of how to keep the protective mesh away from the user's body by sewing and construction techniques alone, not by rigidity of shape or cumbersome devices.

In summary, the invention disclosed herein provides a comfortable and durable garment that will protect the user against insects under rugged or tropical conditions.

Further advantages and applications of the present invention will become apparent to those skilled in the art of insect protective garments upon examination of the drawings and descriptions of the best modes of the invention.

BRIEF DESCRIPTION OF DRAWINGS

FIG. 1 is a front view of a jacket garment embodying the invention.

FIG. 2 is a back view of the garment illustrated in FIG. 1.

FIG. 3 is a partial front view of the garment illustrated in FIG. 1.

FIG. 4 is a front view of a another garment embodying the invention.

BEST MODE OF THE INVENTION

Referring now to the drawings and in particular to FIG. 1 a preferred embodiment of the invention in the form of a jacket 10 is shown.

The jacket is made of semi-rigid mesh such as the dacron-coated fibreglass commonly sold as window-screening or a stiffened nylon netting.

The garment has a separating front zipper 12 that allows the user to get in and out of the garment easily and a tubular section 14 that stretches around the bottom of the jacket and is open at both ends to allow the drawstring 15 to pass through.

The garment features an insect-impervious shoulder yoke 16 lined in a material such as heavy cotton that can protect against insect stings.

The user's arms are protected by sleeves 18 of the semi-rigid mesh described earlier. These sleeves are kept away from the body at the top of the shoulders by the gathers 20 associated with the impervious shoulder yoke. The sleeves are also provided with gathers 24 above the VELCRO closings 22 at the wrist.

The function of shoulder gathers 20 and wrist gathers 24 is to maintain the critical distance between the mesh and the user's skin at these points.

Maintaining said critical distance is the function of the chest gathers 26 associated with shoulder yoke 16 and is also the function of the gentle puckering 28 that occurs when drawsting 14 is drawn tightly about the user's waist.

The garment features a hood 30 sewn to the neckhole 44 and fashioned of the same protective mesh as the jacket proper. Hood 30 has a protective facemesh panel 32 by stitching 34. When worn over the user's face, the sides of facemesh panel are secured to the sides of the hood's facehole 31 by strips of VELCRO 36.

FIG. 2 is a backview of said garment and shows facemesh panel 32 thrown over the top of hood 30 to uncover the user's face for eating, drinking, or smoking. The bottom of facemesh panel 32 is anchored to the back of hood 30 by strips of VELCRO 38 sewn to the bottom of the facemesh panel and the back of the hood. FIG. 2 also shows back gathers 40 which help to keep the material of the garment away from the user's skin so that insects stingers cannot make contact with the skin.

FIG. 3 illustrates a feature of the garment that enhances the garment's insect-protective characteristics. This feature is the piping 42 that runs in one unbroken piece across the bottom of the shoulder yoke in back and in two pieces that run across the user's chest at the bottom of the shoulder yoke in front the piping preferably is at least 0.75 centimeters in diameter.

FIG. 3 also shows the juncture of shoulder yoke 16 with top sleeve gathers 20, front gathers 26, and piping 42. As shown, piping 42 extends from the center of the garment outward towards sleeve 18 and lies between gathers 26 and the user's body thereby holding the gathers and the bottom of yoke 16 away from the user's body.

FIG. 4 is a front view of a second embodiment of the invention, a coverall garment 50 comprising the jacket of claim 1 with a pair of integral trouser legs 52. Trouser legs 52 have VELCRO closings 54 at the leg openings and have gathers 56 at the point of attachment. As mentioned before, the function of these gathers is to help the insect-protective mesh stand away from the user's skin so that contact is prevented.

To allow the user to perform necessary bodily functions without disrobing, the garment may be provided with zipper 62, stretching across the crotch area. Another function of zipper 62 is to enhance the garment's durability by providing reinforcement for the garment at the crotch.

The usefulness of garment 50 may be further enhanced by the addition of a two-paneled external pocket 58 made of a sturdy material such as cottom and sealed at the top with VELCRO closings 60.

I claim:

1. A protective garment comprising:
   A. an insect-impervious yoke having a neckhole, said yoke extending downwardly from said neckhole to the front and the rear thereof;
   B. piping having a diameter of at least 0.75 cm attached to the lower edges of said yoke;
   C. semi-rigid mesh material connected to said yoke in gathers outside of said piping, whereby said piping holds said mesh material away from a user's chest and back.

2. The garment of claim 1 including a hood sewn to said neckhole, said hood extending diagonally upwardly to a position forward of a user's face.

3. The garment of claim 2 with the hood made of semi-rigid mesh and having an attached facemesh panel made of the same semi-rigid mesh.

4. The garment of claim 1 including integral trousers made of the same semi-rigid mesh material, said trousers having ankle closures.

5. The garment of claim 4 including ankle closures of hook and loop material.

* * * * *

UNITED STATES PATENT AND TRADEMARK OFFICE
CERTIFICATE OF CORRECTION

PATENT NO. : 4,685,152

DATED : 8/11/87

INVENTOR(S) : Nicole G. Heare

It is certified that error appears in the above-identified patent and that said Letters Patent are hereby corrected as shown below:

Column 4, line 60, insert the following:

---6. the garment of claim 4 with a zipper in the crotch, said zipper being placed perpendicularly to the front closing zipper in a garment's torso area---

Column 2, line 64, delete "naatural" and insert ---natural---

On the title page, "5 Claims" should read -- 6 Claims --.

Signed and Sealed this

Twenty-fourth Day of November, 1987

Attest:

DONALD J. QUIGG

Attesting Officer

Commissioner of Patents and Trademarks